United States Patent [19]

Correll et al.

[11] 4,351,812

[45] Sep. 28, 1982

[54] HYDROLYSIS OF CARBON OXYSULFIDE WITH MORPHOLINES AND PIPERAZINES

[75] Inventors: Glenn D. Correll, Birdsboro, Pa.; Hans R. Friedli, Lake Jackson, Tex.

[73] Assignee: The Dow Chemical Company, Midland, Mich.

[21] Appl. No.: 174,999

[22] Filed: Aug. 4, 1980

Related U.S. Application Data

[63] Continuation-in-part of Ser. No. 936,675, Aug. 24, 1978, abandoned.

[51] Int. Cl.$^3$ .................. C01B 17/00; C02B 1/18; C01B 31/20; C01B 17/66
[52] U.S. Cl. .................. 423/243; 423/437; 423/563; 210/749
[58] Field of Search ............ 423/242 A, 242 R, 243, 423/244 A, 244 R, 563, 564, 437; 210/749

[56] References Cited

U.S. PATENT DOCUMENTS

| | | | |
|---|---|---|---|
| 4,080,423 | 3/1978 | Smith et al. | 423/243 |
| 4,100,256 | 7/1978 | Bozzelli et al. | 423/563 |

FOREIGN PATENT DOCUMENTS

| | | |
|---|---|---|
| 750177 | 5/1970 | Belgium . |
| 1113674 | 4/1956 | France . |
| 1058304 | 2/1967 | United Kingdom . |
| 1560905 | 2/1980 | United Kingdom . |

*Primary Examiner*—O. R. Vertiz
*Assistant Examiner*—Gregory A. Heller
*Attorney, Agent, or Firm*—B. G. Colley

[57] ABSTRACT

The hydrolysis of carbon oxysulfide in a gas or liquid stream is catalyzed by morpholines and piperazines at a temperature in the range from about 50° about 90° C. The process can be used in the treatment of refinery gases, coal gasification streams, and other such gases as well as liquid hydrocarbons which contain COS and other acidic contaminants.

23 Claims, No Drawings

HYDROLYSIS OF CARBON OXYSULFIDE WITH MORPHOLINES AND PIPERAZINES

CROSS REFERENCE TO RELATED APPLICATIONS

This application is a continuation-in-part of Ser. No. 936,675 filed Aug. 24, 1978 now abandoned.

BACKGROUND OF THE INVENTION

This invention relates to a method for hydrolyzing carbon oxysulfide, more particularly to a method whereby the hydrolysis is catalyzed by morpholines and piperazines.

Carbon oxysulfide or carbonyl sulfide (COS) is often present in minor amounts in petroleum refinery gases and it is found in larger amounts in coal gasification product streams. This toxic contaminant poses a special problem in sour gas purification processes since it is neither readily separated nor easily hydrolyzed by known gas treating solvents under ordinary conditions. It is an undesirable contaminant in a Claus plant feed stream, since it is not readily converted to sulfur, and it is necessary to remove it from fuel gases and the like for reasons of corrosion and air pollution. Carbon oxysulfide reacts irreversibly with ethanolamine but this is not usually a practical method for removing it from a gas stream because the solvent cannot be regenerated. The use of sulfolane, diisopropanolamine, methyldiethanolamine, and mixtures thereof are known to be useful to hydrolyze COS but the present invention gives a higher percent hydrolysis.

It is known from Belgium Pat. No. 750,177 that aqueous morpholine solution reacts with COS to form a precipitate which is recovered and subsequently treated to heat and pressure to recover morpholine. The present invention eliminates the need for the formation of a precipitate.

U.S. Pat. No. 4,100,256 describes a process for COS hydrolysis using an aqueous solution of piperazinone compounds however the present invention is more effective in that a higher degree of hydrolysis is obtained. For example, a 50% solution of morpholine gave 83% hydrolysis at 100° C. and under the same conditions 1,4-dimethyl piperazinone gave 15% hydrolysis.

SUMMARY OF THE INVENTION

It has now been found that carbon oxysulfide is rapidly and efficiently hydrolyzed to $H_2S$ and $CO_2$ when a gas or liquid stream containing it is contacted with an aqueous solution of one or more of the N-heterocyclic compound having the formula:

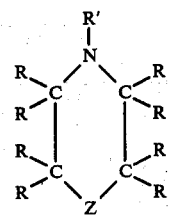

wherein Z is an oxygen atom or

each R is independently a hydrogen atom or an alkyl group of 1-2 carbon atoms and R' is the 2-amino ethyl group when Z is

and R' is a hydrogen atom when Z is an oxygen atom.

The hydrolysis can be carried out effectively using an N-heterocyclic compound or mixtures thereof in a solution containing an amount sufficient to hydrolyze the COS or at least about 25% by weight of the N-heterocyclic compounds, but preferably the hydrolysis process is operated with a solution containing about 25% to about 75% by weight of the N-hetercyclic compounds. The process temperature can range from about 50° to about 90° C. with the preferred range being 80°–90° C. The process of this invention is useful hydrolyzing COS in gas streams such as natural gases, synthetic gases, refinery gases, cracked gases and the like. The invention is also applicable to liquid hydrocarbon streams containing COS.

This invention is particularly useful to treat gas streams containing $H_2S$, and $CO_2$, in addition to COS since $H_2S$ and $CO_2$ do not inhibit the COS hydrolysis reaction.

DETAILED DESCRIPTION OF THE INVENTION

The N-heterocyclic compounds useful in this invention generally comprise morpholine, and piperazine, and their alkylated derivatives which are water soluble.

Examples of useful morpholines are morpholine, 3,3-dimethylmorpholine, 2,6-dimethylmorpholine, 2,3,6-triethylmorpholine, 2-ethylmorpholine, 2,3,5,6-tetramethylmorpholine and the like.

Examples of useful piperazines are piperazine, N-methyl piperazine, N-ethyl piperazine, 2,6-dimethyl piperazine, N-aminoethyl piperazine, 1,3-dimethyl piperazine and the like.

These morpholines and piperazines (hereinafter N-heterocyclic compounds) are hygroscopic and, since most gas streams of the kind treated by this process normally contain more or less water vapor, in practice there is almost always some water present as the process continues even when the N-heterocyclic compound solution is initially essentially anhydrous.

The aqueous N-heterocyclic solution can also include a substantial proportion of one or more known gas-treating solvents; for example, an alkanolamine or sulfolane. Lower alkanolamines such as ethanolamine, diethanolamine, N-methyldiethanolamine, triethanolamine, isopropanolamine, and diisopropanolamine are common examples of that class. Such an additional solvent can comprise up to about 50 percent by weight of the solution although preferably it is limited to about 30 percent of the total. The hydrolysis of COS in the presence of the N-heterocyclic compounds is apparently a catalytic effect and this effect is facilitated by the increased solubility of COS in the solution provided by an additional solvent such as sulfolane or an alkanolamine. Any significant proportion of N-heterocyclic compound in the solution will promote the hydrolysis to some extent, but a more practical rate of hydrolysis is obtained when the N-heterocyclic compound comprises at least about 25 percent of the gas-treating solution. The range of N-heterocyclic compound in the aqueous solution is 25-75% by weight with 40-60% by weight being the preferred range.

The hydrolysis process can be run at any convenient pressure and atmospheric or superatmospheric pressure is preferred. Contact time can vary widely from a few seconds to a few minutes, i.e., five minutes or more depending upon the temperature, concentration and composition of the aqueous N-heterocyclic solution, and the amount of COS present in the gas being treated.

If desired, desorption of $H_2S$ and $CO_2$ formed by hydrolysis is efficiently accomplished by merely heating the aqueous N-heterocyclic medium to a temperature of about 85° C. or above, preferably to 100°–150° C. Moderately reduced pressure will accelerate the desorption to some extent although this is usually not necessary.

EXAMPLES 1-5

The apparatus used in these examples utilized a 20-tray 1 inch diameter Oldershaw column as the gas-liquid contactor. A liquid solution was continuously pumped to the top of the column in a closed type circuit. Natural gas was introduced at the bottom of the column and vented. The liquid was preheated before entering the column. The liquid reservoir contained about 3000 gms total. The natural gas was modified by adding $CO_2$, $H_2S$, and COS in the amounts set forth below.

The following data of Table I was obtained using a 50 wt.% aqueous solution of morpholine.

EXAMPLES 6 AND 7

Following the procedure set forth in Examples 1-5, the data of Table II was obtained using a 25 wt.% aqueous solution of morpholine.

CONTROL A

Following the above procedure the data in Table III was obtained using a 90 wt.% aqueous solution of morpholine.

The above system worked well for hydrolysis but the entire apparatus quickly plugged up with morpholine salts of $CO_2$ and $H_2S$ which could not be held in solution because of the small amount of water present.

EXAMPLES 8-18

Following the procedure set forth in Examples 1-5 the data of Table IV was collected utilizing aqueous solutions of various piperazine compounds.

EXAMPLES 19-46

The apparatus used in these examples utilized an 8 foot tower 3 inches in diameter packed with ⅜" ceramic saddles. Natural gas was introduced at the bottom of the column. All data collected was with 50 wt.% aqueous morpholine which was preheated and introduced at the top of the column. The natural gas was modified with $CO_2$, $H_2S$ and COS as in Examples 1-5. The data in Table V shows the temperature effects.

TABLE I

| Example No. | Lq. Rate cc/min. | Lq. Temp. °C. | Gas Rate l./min. | Mole %'s In $CO_2$ | $H_2S$ | COS | Mole % Out COS | Hydrolysis % |
|---|---|---|---|---|---|---|---|---|
| 1 | 18 | 75 | 1.0 | 6.9618 | 9.5888 | 0.1191 | 0.0029 | 97.56 |
| 2 | 18 | 75 | 2.0 | 7.9729 | 7.3969 | 0.1101 | 0.0000 | 100 |
| 3 | 10 | 70 | 2.0 | 12.4502 | 1.0906 | 0.0587 | 0.0071 | 87.90 |
| 4 | 5 | 70 | 2.0 | 11.4585 | 1.2252 | 0.0844 | 0.0106 | 87.44 |
| 5 | 10 | 70 | 2.0 | 11.7270 | 0.8692 | 0.1152 | 0.0110 | 90.45 |

TABLE II

| Example No. | Lq. Rate cc/min. | Lq. Temp. °C. | Gas Rate l./min. | Mole %'s In $CO_2$ | $H_2S$ | COS | Mole % Out COS | Hydrolysis % |
|---|---|---|---|---|---|---|---|---|
| 6 | 10 | 70 | 2.2 | 9.3980 | 0.0000 | 0.1228 | 0.0224 | 81.76 |
| 7 | 10 | 70 | 2.2 | 9.1092 | 0.0000 | 0.1261 | 0.0622 | 50.67 |

TABLE III

| Ref. No. | Lq. Rate cc/min. | Lq. Temp. °C. | Gas Rate l./min. | Mole %'s In $CO_2$ | $H_2S$ | COS | Mole % Out COS | Hydrolysis % |
|---|---|---|---|---|---|---|---|---|
| Control A | 10 | 25 | 2.0 | 9.4470 | 0.0000 | 0.1508 | 0.0004 | 99.73 |

TABLE IV

| Example No. | Compound Wt. % | Lq. Rate cc/min. | Lq. Temp. °C. | Gas Rate l./min. | Mole %'s In $CO_2$ | $H_2$ | COS | Mole % Out COS | Hydrolysis % |
|---|---|---|---|---|---|---|---|---|---|
| 8 | Piperazine 22 | 18 | 70 | 1.4 | 10.7644 | 1.3790 | 0.1332 | 0.0451 | 66.1 |
| 9 | Piperazine 22 | 10 | 75 | 1.4 | 10.7644 | 1.3790 | 0.1332 | 0.0492 | 63.1 |
| 10 | Piperazine 22 | 10 | 75 | 0.8 | 9.0714 | 0.6961 | 0.1028 | 0.0362 | 64.8 |
| 11 | Piperazine 22 | 10 | 95 | 1.4 | 10.7644 | 1.3790 | 0.1332 | 0.0435 | 67.3 |
| 12 | Piperazine 32 | 10 | 75 | 2.0 | 10.8371 | 0.0000 | 0.0939 | 0.0218 | 76.8 |
| 13 | Piperazine 50 | 18 | 70 | 2.5 | 9.2360 | 0.0000 | 0.1006 | 0.0190 | 81.1 |
| 14 | Piperazine 50 | 18 | 70 | 2.5 | 14.2290 | 0.0000 | 0.1473 | 0.0154 | 89.5 |
| 15 | Piperazine 50 | 18 | 70 | 2.5 | 12.0865 | 0.0000 | 0.1342 | 0.0190 | 85.8 |
| 16 | Piperazine 50 | 18 | 70 | 2.5 | 11.1082 | 0.0000 | 0.1339 | 0.0202 | 84.9 |

TABLE IV-continued

| Example No. | Compound Wt. % | Lq. Rate cc/min. | Lq. Temp. °C. | Gas Rate l./min. | Mole %'s In CO$_2$ | H$_2$ | COS | Mole % Out COS | Hydrolysis % |
|---|---|---|---|---|---|---|---|---|---|
| 17 | Aminoethyl-piperazine 50 | 18 | 70 | 2.3 | 5.9389 | 0.0000 | 0.1129 | 0.0204 | 81.9 |
| 18 | Aminoethyl-piperazine 50 | 10 | 70 | 2.3 | 8.6509 | 0.0000 | 0.1241 | 0.0510 | 58.9 |

TABLE V

| Example No. | Gas Rate SCFM | Lq. Rate GPH | Mole %'s In CO$_2$ | H$_2$ | COS | Mole % Out COS | Hydrolysis % |
|---|---|---|---|---|---|---|---|
| | Hydrolysis at 60° C. | | | | | | |
| 19 | 2.1 | 7.68 | 44.582 | 1.327 | 0.0500 | 0.0165 | 60.0 |
| 20 | 2.1 | 7.68 | 45.227 | 1.855 | 0.0270 | 0.0165 | 38.9 |
| 21 | 2.1 | 7.68 | 23.590 | 0.912 | 0.0090 | 0.0039 | 58.3 |
| | Hydrolysis at 70° C. | | | | | | |
| 22 | 2.5 | 8.04 | 3.740 | 0.710 | 0.5971 | 0.0416 | 93.0 |
| 23 | 2.5 | 8.04 | 8.701 | 0.236 | 0.3690 | 0.0780 | 78.9 |
| 24 | 2.4 | 7.02 | 10.657 | 0.987 | 0.7050 | 0.1015 | 85.6 |
| 25 | 2.4 | 7.08 | 11.562 | 1.163 | 1.385 | 0.1500 | 89.2 |
| 26 | 2.4 | 6.96 | 17.486 | 1.251 | 0.687 | 0.1160 | 83.1 |
| | Hydrolysis at 80° C. | | | | | | |
| 27 | 1.96 | 7.08 | 2.1110 | 0.584 | 0.1570 | 0.0175 | 88.8 |
| 28 | 1.96 | 6.96 | 2.7620 | 0.270 | 0.2660 | 0.0235 | 91.2 |
| 29 | 1.96 | 7.08 | 6.852 | 0.367 | 0.1990 | 0.0290 | 85.4 |
| 30 | 2.03 | 6.96 | 3.614 | 0.452 | 0.2390 | 0.0255 | 89.3 |
| 31 | 2.03 | 7.08 | 3.437 | 1.090 | 0.3890 | 0.0230 | 94.1 |
| 32 | 2.03 | 7.08 | 3.012 | 0.369 | 0.2280 | 0.0195 | 91.4 |
| 33 | 2.03 | 7.08 | 2.256 | 0.325 | 0.1920 | 0.0175 | 90.9 |
| 34 | 1.96 | 7.08 | 2.107 | 0.266 | 0.1960 | 0.0195 | 90.0 |
| 35 | 1.96 | 7.20 | 2.232 | 0.279 | 0.1870 | 0.0210 | 88.8 |
| 36 | 1.96 | 6.84 | 2.612 | 0.391 | 0.2210 | 0.0255 | 83.5 |
| | Hydrolysis at 90° C. | | | | | | |
| 37 | 1.58 | 7.08 | 2.529 | 0.405 | 0.4590 | 0.0310 | 93.2 |
| 38 | 1.58 | 7.08 | 2.152 | 0.439 | 0.5160 | 0.0133 | 97.4 |
| 39 | 1.26 | 6.96 | 3.794 | 1.836 | 0.0190 | 0.0020 | 89.5 |
| 40 | 1.58 | 6.96 | 3.070 | 1.115 | 0.8110 | 0.0345 | 95.8 |
| 41 | 1.58 | 6.96 | 2.887 | 1.087 | 0.896 | 0.0305 | 96.6 |
| 42 | 1.58 | 6.96 | 2.560 | 1.070 | 0.704 | 0.0245 | 96.5 |
| 43 | 1.26 | 7.08 | 3.463 | 1.853 | 0.0140 | 0.0010 | 92.9 |
| 44 | 1.26 | 7.08 | 3.282 | 1.721 | 0.0110 | 0.0010 | 90.9 |
| 45 | 1.26 | 7.14 | 3.359 | 1.779 | 0.0100 | 0.0000 | 100 |
| 46 | 1.26 | 7.14 | 3.519 | 1.759 | 0.0100 | 0.0010 | 90.0 |

EXAMPLES 47–53

Following the procedure set forth in Examples 19–46, a 50 weight percent aqueous morpholine solution was used at 90° C., a liquid rate of 11–12 gallons per hour (gph) to contact a modified natural gas stream flowing at 1.1 to 1.5 standard cubic feet per minute (SCFM) to give a residence time of 54–67 seconds. The averages of several runs are set forth in Table VI.

TABLE VI

| Example No. | Mole % COS IN | Mole % COS Out | Average % Hydrolysis | Notes |
|---|---|---|---|---|
| 47 | 0.05–0.10 | 0.0042 | 94.76 | Av. of 9 runs |
| 48 | 0.10–0.15 | 0.0072 | 94.01 | Av. of 13 runs |
| 49 | 0.15–0.20 | 0.0113 | 93.03 | Av. of 10 runs |
| 50 | 0.10–0.25 | 0.0143 | 93.48 | Av. of 8 runs |
| 51 | 0.25–0.40 | 0.0206 | 93.72 | Av. of 4 runs |
| 52 | 0.40–0.75 | 0.0390 | 92.14 | Av. of 7 runs |
| 53 | 0.75–1.25 | 0.1240 | 87.90 | Single run |

EXAMPLES 54–57

In a manner similar to Examples 47–53 a 50% aqueous solution of morpholine at 90° C., a liquid rate of 12–19 gph, a gas rate of 1.3–1.5 SCFM was used to give a residence time of 50–60 seconds. The averages of several runs are set forth in Table VII.

TABLE VII

| Example No. | Mole % COS IN | Mole % COS Out | Average % Hydrolysis | Notes |
|---|---|---|---|---|
| 54 | 0.05–0.10 | .0052 | 94.6 | Av. of 2 runs |
| 55 | 0.10–0.15 | .0090 | 93.1 | Av. of 9 runs |
| 56 | 0.15–0.20 | .0115 | 93.3 | Av. of 8 runs |
| 57 | 0.20–0.25 | .0119 | 94.6 | Av. of 7 runs |

EXAMPLES 58–62

Using the same hydrolysis temperature and solution as in Examples 47–53 with a gas rate of 1.0–1.3 SCFM, a liquid circulation rate of 25 gph and a gas residence time of 60–75 seconds, the run averages of Table VIII were obtained.

TABLE VIII

| Example No. | Mole % COS IN | Mole % COS Out | Average % Hydrolysis | Notes |
|---|---|---|---|---|
| 58 | 0.05–0.10 | 0.0030 | 97.0 | Single run |
| 59 | 0.10–0.15 | 0.0065 | 95.6 | Av. of 2 runs |
| 60 | 0.15–0.20 | 0.0062 | 96.5 | Av. of 13 runs |
| 61 | 0.20–0.25 | 0.0097 | 96.1 | Av. of 9 runs |
| 62 | 0.25–0.35 | 0.0086 | 97.0 | Av. of 6 runs |

EXAMPLES 63-68

Using the equipment set forth in Examples 19-46, the tower was flooded almost to the top leaving a small air space. It was found that under these conditions, the flow rate could be reduced to 8 or 9 gallons per hour and the percent hydrolysis could be increased. In these examples, a 50% aqueous morpholine solution was used at a temperature of 90° C. The inlet gas flow rate was 1.5 SCFM and the residence time was 50-53 seconds. The results are set forth in Table IX.

TABLE IX

| Example No. | Mole % COS IN | Mole % COS Out | Average % Hydrolysis | Notes |
|---|---|---|---|---|
| 63 | 0.05-0.10 | 0.0060 | 91.4 | Single run |
| 64 | 0.10-0.15 | 0.0043 | 96.9 | Av. of 5 runs |
| 65 | 0.15-0.20 | 0.0060 | 96.4 | Single run |
| 66 | 0.20-0.25 | 0.0044 | 98.1 | Av. of 3 runs |
| 67 | 0.25-0.35 | 0.0043 | 98.5 | Av. of 7 runs |
| 68 | 0.35-0.76 | 0.0033 | 99.3 | Av. of 5 runs |

While the examples illustrate the use of a single compound in aqueous solution, similar results are obtained when one or more of these compounds are used.

We claim:

1. A process for hydrolyzing COS to $H_2S$ and $CO_2$ which comprises contacting a COS-containing gas or liquid stream with an aqueous N-heterocyclic compound solution of one or more of the N-heterocyclic compounds having the formula:

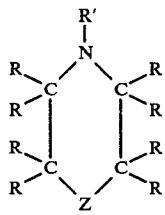

wherein Z is an oxygen atom or

each R is independently a hydrogen atom or an alkyl group of 1-2 carbon atoms, R' is the 2-amino ethyl group when Z is

and R' is a hydrogen atom when Z is an oxygen atom wherein said solution contains an amount of said heterocyclic compound sufficient to hydrolyze the COS.

2. The process of claim 1 wherein the COS stream is a gas.

3. The process of claim 1 wherein the N-heterocyclic compound solution contains at least about 25% by weight of said N-heterocyclic compound.

4. The process of claim 1 wherein the COS containing gas is contacted with the aqueous N-heterocyclic compound at a temperature in the range of from about 50° to about 90° C.

5. The process of claim 3 wherein said N-heterocyclic compound is present in an aqueous solution containing about 25% to about 75% of said N-heterocyclic compound.

6. The process of claim 5 wherein said N-heterocyclic compound is morpholine.

7. The process of claim 5 wherein said N-heterocyclic compound is piperazine.

8. The process of claim 5 wherein said N-heterocyclic compound is N-amnoethyl piperazine.

9. The process of claim 5 wherein the COS-containing gas is contacted with the aqueous N-heterocyclic compound at a temperature in the range from about 50° to about 90° C.

10. A process for hydrolyzing COS to $H_2S$ and $CO_2$ which comprises contacting a COS-containing gas or liquid stream with an aqueous N-heterocyclic compound solution of one or more of the N-heterocyclic compounds having the formula:

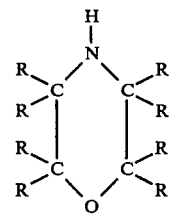

wherein each R is independently a hydrogen atom or an alkyl group of 1-2 carbon atoms, and wherein said solution contains at least about 25% by weight of said heterocyclic compound.

11. The process of claim 10 wherein the COS stream is a gas.

12. The process of claim 10 wherein the COS containing gas is contacted with the aqueous N-heterocyclic compound at a temperature in the range of from about 50° to about 90° C.

13. The process of claim 10 wherein said N-heterocyclic compound is present in an aqueous solution containing about 25% to about 75% of said N-heterocyclic compound.

14. The process of claim 13 wherein said N-heterocyclic compound is morpholine.

15. The process of claim 13 wherein the COS-containing gas is contacted with the aqueous N-heterocyclic compound at a temperature in the range of from about 50° to about 90° C.

16. A process for hydrolyzing COS to $H_2S$ and $CO_2$ which comprises contacting a COS-containing gas or liquid stream with an aqueous N-heterocyclic compound solution of one or more of the N-heterocyclic compounds having the formula:

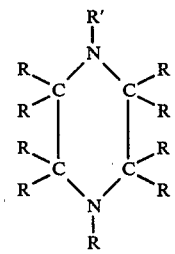

wherein each R is independently a hydrogen atom or an alkyl group of 1-2 carbon atoms, and R' is the 2-amino ethyl group of hydrogen wherein said solution contains at least about 25% by weight of said heterocyclic compound.

17. The process of claim 16 wherein the COS stream is a gas.

18. The process of claim 16 wherein the COS containing gas is contacted with the aqueous N-heterocyclic compound at a temperature in the range of from about 50° to about 90° C.

19. The process of claim 16 wherein said N-heterocyclic compound is present in an aqueous solution containing about 25% to about 75% of said N-heterocyclic compound.

20. The process of claim 19 wherein said N-heterocyclic compound is piperazine.

21. The process of claim 19 wherein said N-heterocyclic compound is N-aminoethylpiperazine.

22. The process of claim 19 wherein the COS-containing gas is contacted with the aqueous N-heterocyclic compound at a temperature in the range from about 50° to about 90° C.

23. A process for continuously hydrolyzing COS in a gas stream containing the same which comprises:

contacting the stream with an aqueous solution of an N-heterocyclic compound having the formula:

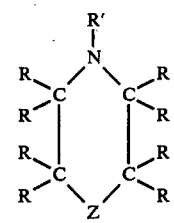

wherein Z is an oxygen atom or

each R is independently a hydrogen atom or an alkyl group of 1–2 carbon atoms, R' is the 2-amino ethyl group when Z is

and R' is a hydrogen atom when Z is an oxygen atom,
wherein said N-heterocyclic compound is present in from about 25 to about 75 percent in said aqueous solution,
wherein said contacting is carried out in a gas-liquid contact column with countercurrent flow, and
wherein said aqueous solution is heated to a temperature range of about 50° C. to about 90° C. and continuously recirculated to said column thereby to effectuate the hydrolysis without any substantial precipitate formation.

* * * * *